(12) United States Patent
Katayama et al.

(10) Patent No.: US 8,168,031 B2
(45) Date of Patent: May 1, 2012

(54) METHOD FOR METAL-RESIN JOINING AND A METAL-RESIN COMPOSITE, A METHOD FOR GLASS-RESIN JOINING AND A GLASS-RESIN COMPOSITE, AND A METHOD FOR CERAMIC-RESIN JOINING AND A CERAMIC-RESIN COMPOSITE

(75) Inventors: Seiji Katayama, Suita (JP); Yosuke Kawahito, Suita (JP); Shuji Kubota, Ohtsu (JP); Akio Tange, Ohtsu (JP)

(73) Assignee: Osaka University, Suita-shi (JP)

( * ) Notice: Subject to any disclaimer, the term of this patent is extended or adjusted under 35 U.S.C. 154(b) by 1094 days.

(21) Appl. No.: 12/065,584

(22) PCT Filed: Aug. 7, 2006

(86) PCT No.: PCT/JP2006/315607
§ 371 (c)(1),
(2), (4) Date: Mar. 3, 2008

(87) PCT Pub. No.: WO2007/029440
PCT Pub. Date: Mar. 15, 2007

(65) Prior Publication Data
US 2009/0252978 A1    Oct. 8, 2009

(30) Foreign Application Priority Data

Sep. 1, 2005 (JP) .................................. 2005-253318
May 24, 2006 (JP) .................................. 2006-144036
May 24, 2006 (JP) .................................. 2006-144059

(51) Int. Cl.
*B29C 65/16*    (2006.01)
(52) U.S. Cl. .................................................. 156/272.8

(58) Field of Classification Search ............... 156/272.2, 156/272.8
See application file for complete search history.

(56) References Cited

U.S. PATENT DOCUMENTS
3,627,858 A * 12/1971 Parts et al. .................... 264/416
(Continued)

FOREIGN PATENT DOCUMENTS
JP       60-214931 A    10/1985
(Continued)

OTHER PUBLICATIONS

Translation of paragraphs 0014, and 0022 for JP 10058544 A.*
(Continued)

*Primary Examiner* — Richard Crispino
*Assistant Examiner* — Daniel McNally
(74) *Attorney, Agent, or Firm* — Westerman, Hattori, Daniels & Adrian, LLP

(57) ABSTRACT

The present invention provides a method for joining a metallic material, a glass material or a ceramic material, and a resin material, that have no limitation in their field of application and that can form a strong joint by an easy method. The method for joining a metallic material, a glass material or a ceramic material, and a resin material is characterized in that joining is effected by heating a portion to be joined, in such a state that the metallic material, glass material or ceramic material is coupled with the resin material, to a temperature at which bubbles (preferably the sphere equivalent diameter from 0.01 mm to 5.0 mm) are generated in the resin material at the portion to be joined. As a heating source for heating the portion to be joined, a laser light source is used, especially.

14 Claims, 11 Drawing Sheets

U.S. PATENT DOCUMENTS

| | | | | |
|---|---|---|---|---|
| 4,636,609 A | * | 1/1987 | Nakamata | ................ 219/121.64 |
| 6,468,665 B1 | | 10/2002 | Nagashima et al. | |

FOREIGN PATENT DOCUMENTS

| | | | | |
|---|---|---|---|---|
| JP | 10-58544 A | | 3/1998 | |
| JP | 10058544 A | * | 3/1998 | |
| JP | 2000-233448 A | | 8/2000 | |
| JP | 2002-067165 A | | 3/2002 | |
| JP | 2002-67222 A | | 3/2002 | |
| JP | 2003-1455 A | | 1/2003 | |
| JP | 2003001455 A | * | 1/2003 | |
| JP | 2003-325710 A | | 11/2003 | |
| JP | 2005-070245 A | | 3/2005 | |
| JP | 2006-15405 A | | 1/2006 | |

OTHER PUBLICATIONS

Machine translation of JP 10058544 A, Mar. 1998.*

Mahine translation of JP 2003001455 A, Jan. 2003.*

Translation of International Preliminary Report on Patentability mailed May 22, 2008 of International Application No. PCT/JP2006/315607.

Hideo Nakamura et al; "Application to the plastic parts welding of Diode laser"; The 59th Laser Materials Processing Conference The 50th Research Conference of Nagoya Laser "Technopole", Sep. 19, 2003.

International Search Report of PCT/JP2006/315607, date of mailing Sep. 5, 2006.

* cited by examiner

[Fig. 1]
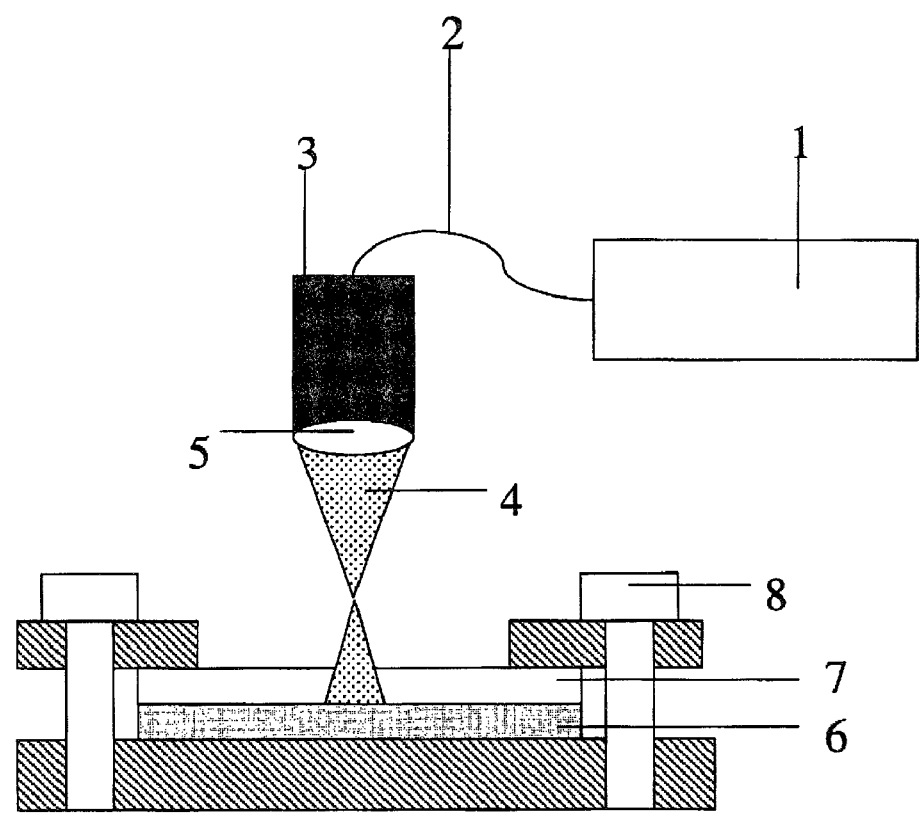

[Fig. 2]
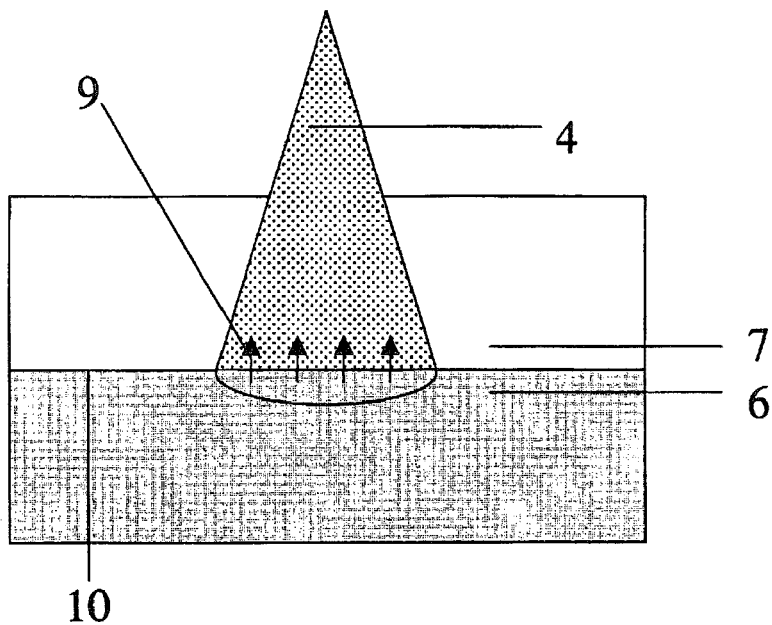
[Fig. 3]
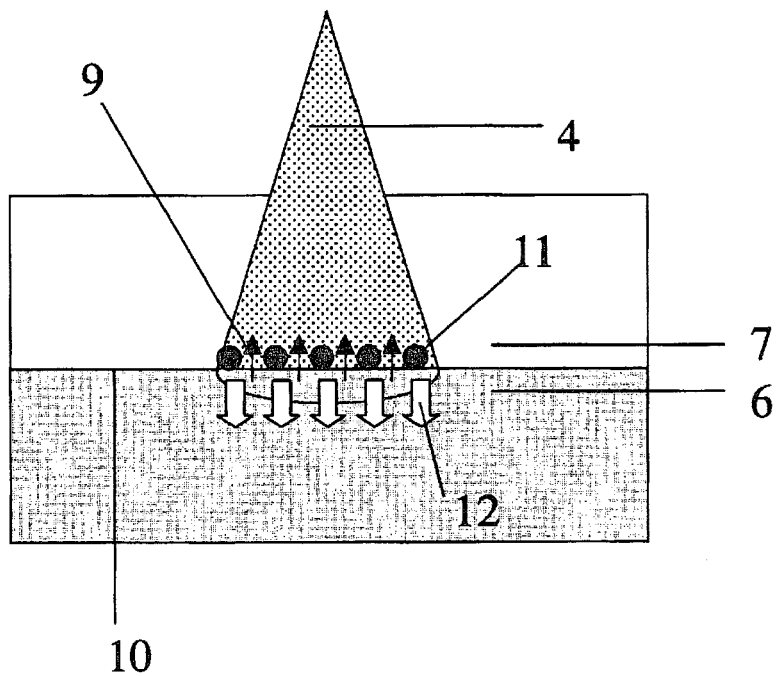

[Fig. 4]
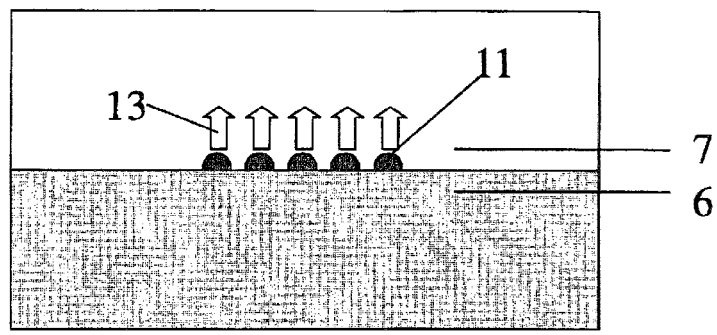
[Fig. 5]
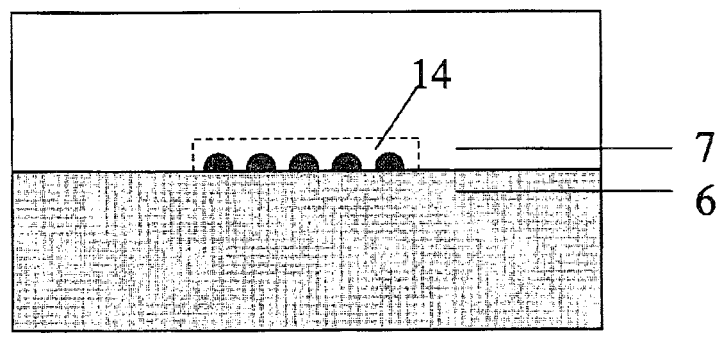

[Fig. 6]
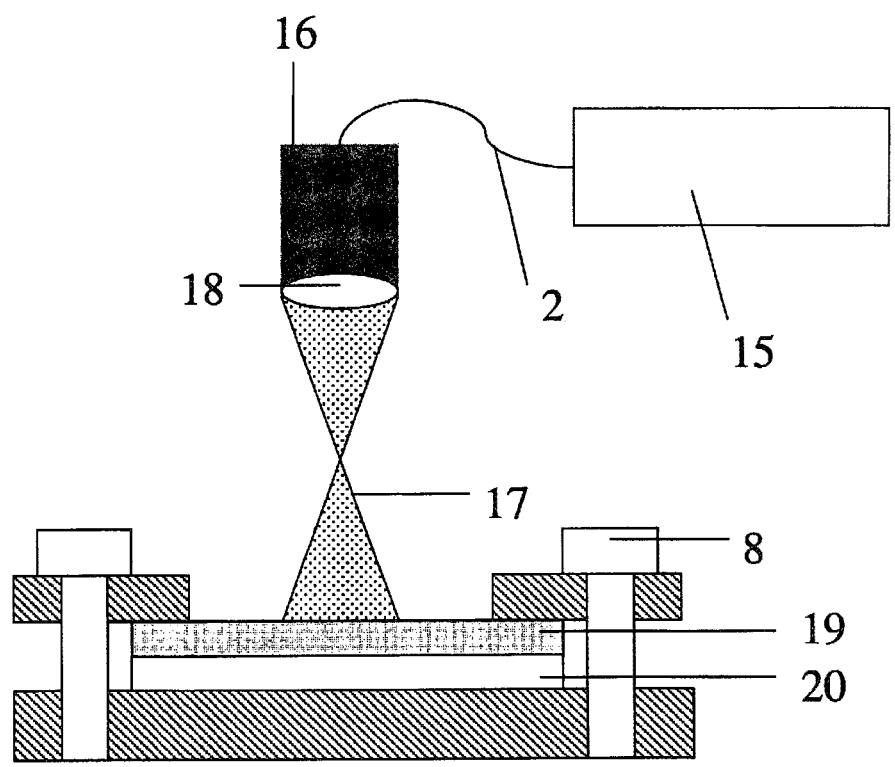

[Fig. 7]
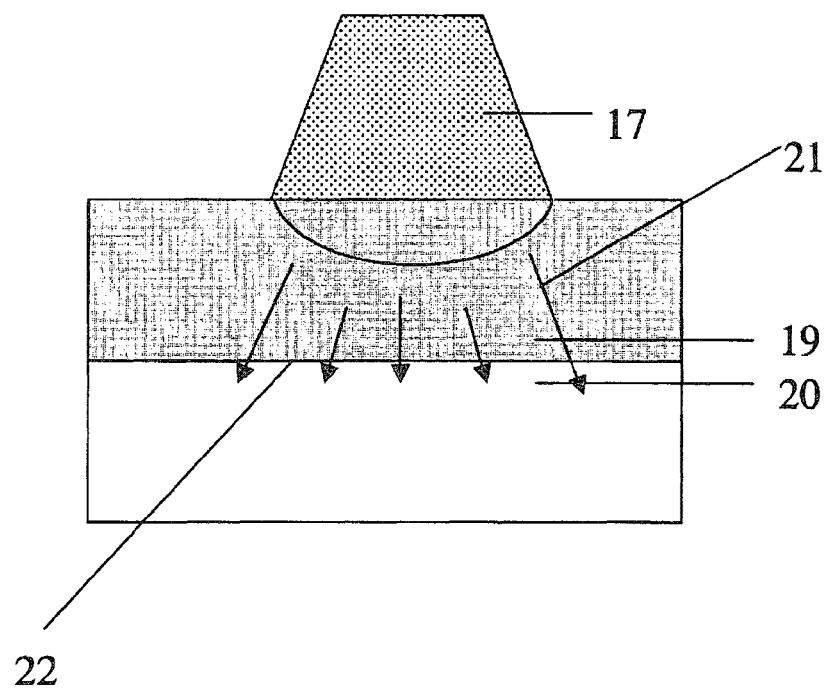

[Fig. 8]
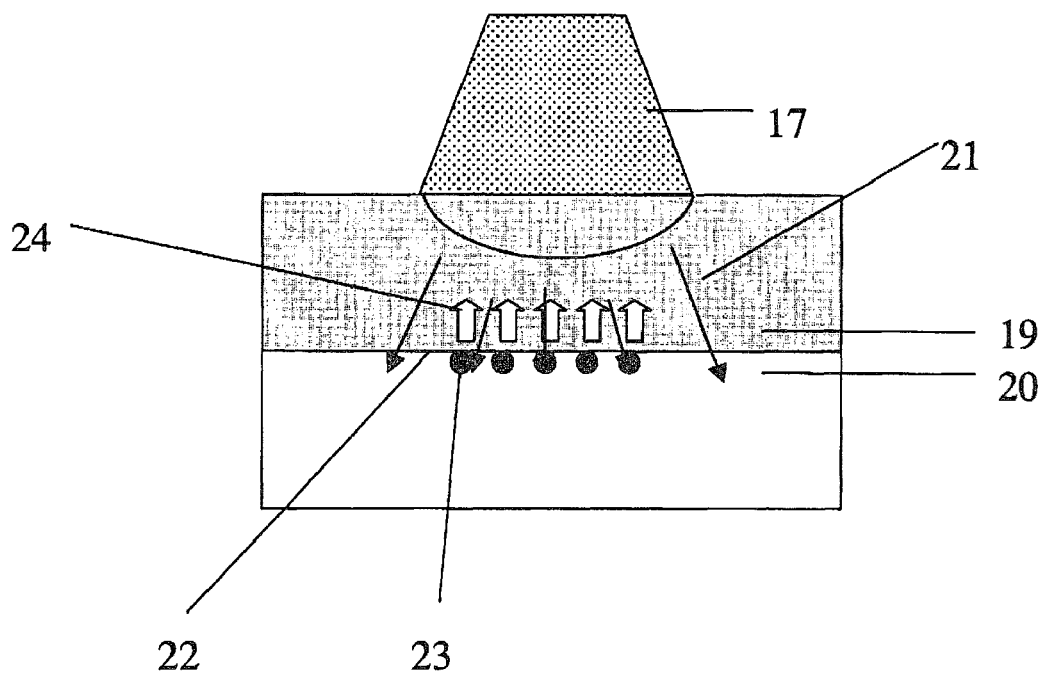
[Fig. 9]
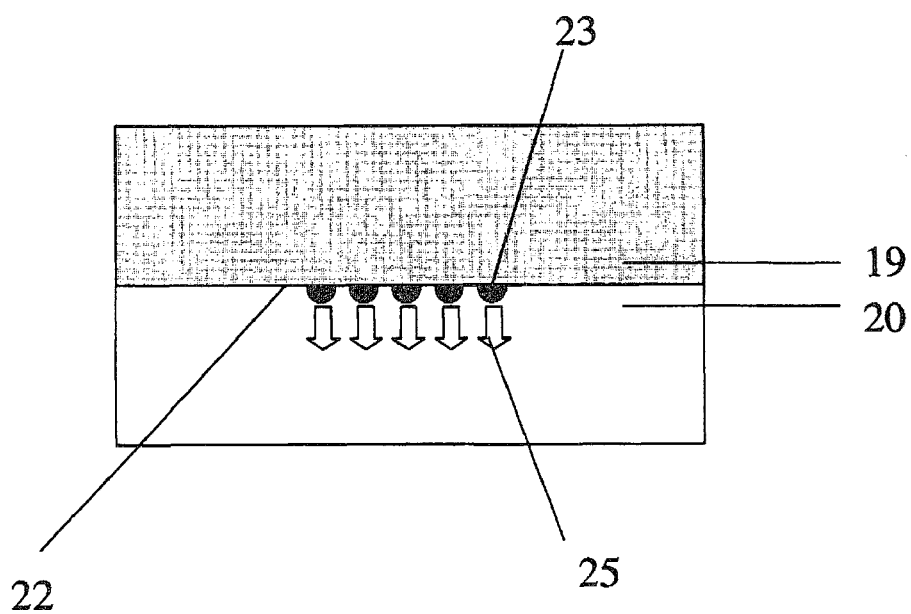

[Fig. 10]
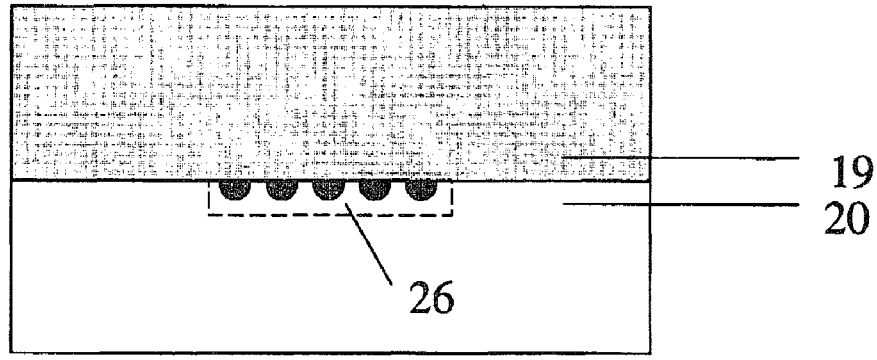

[Fig. 11]
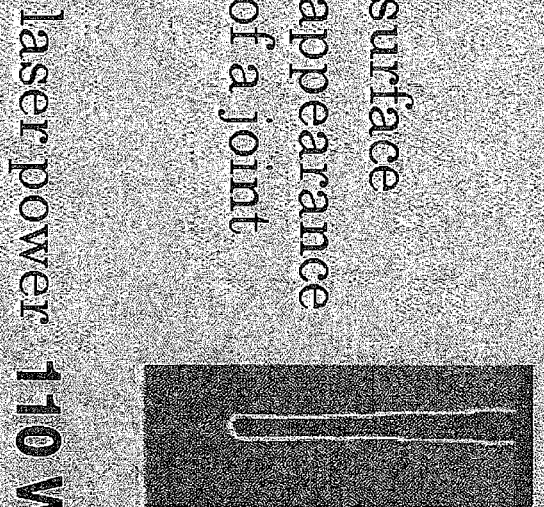

[Fig. 12]
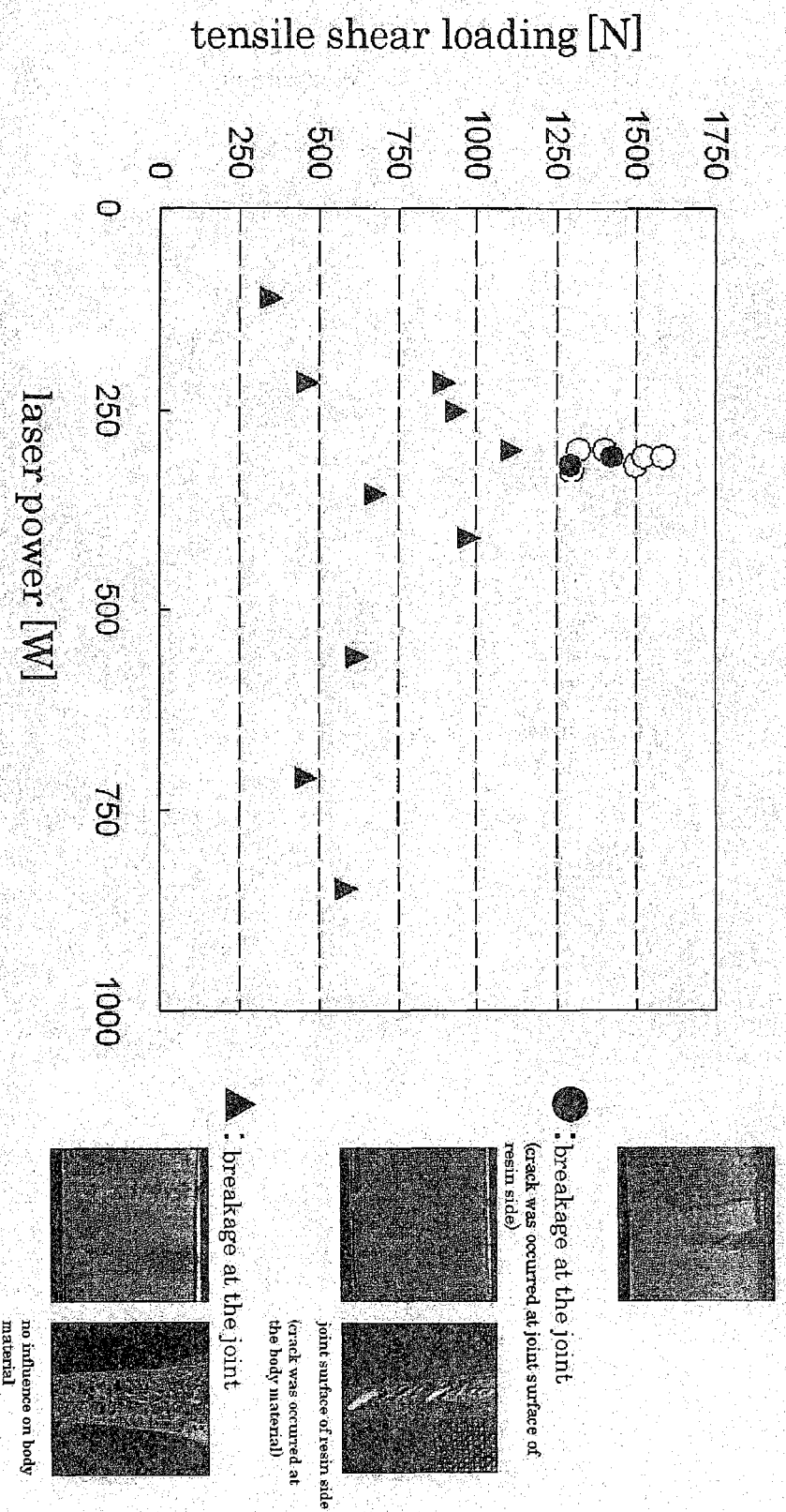

[Fig. 13]
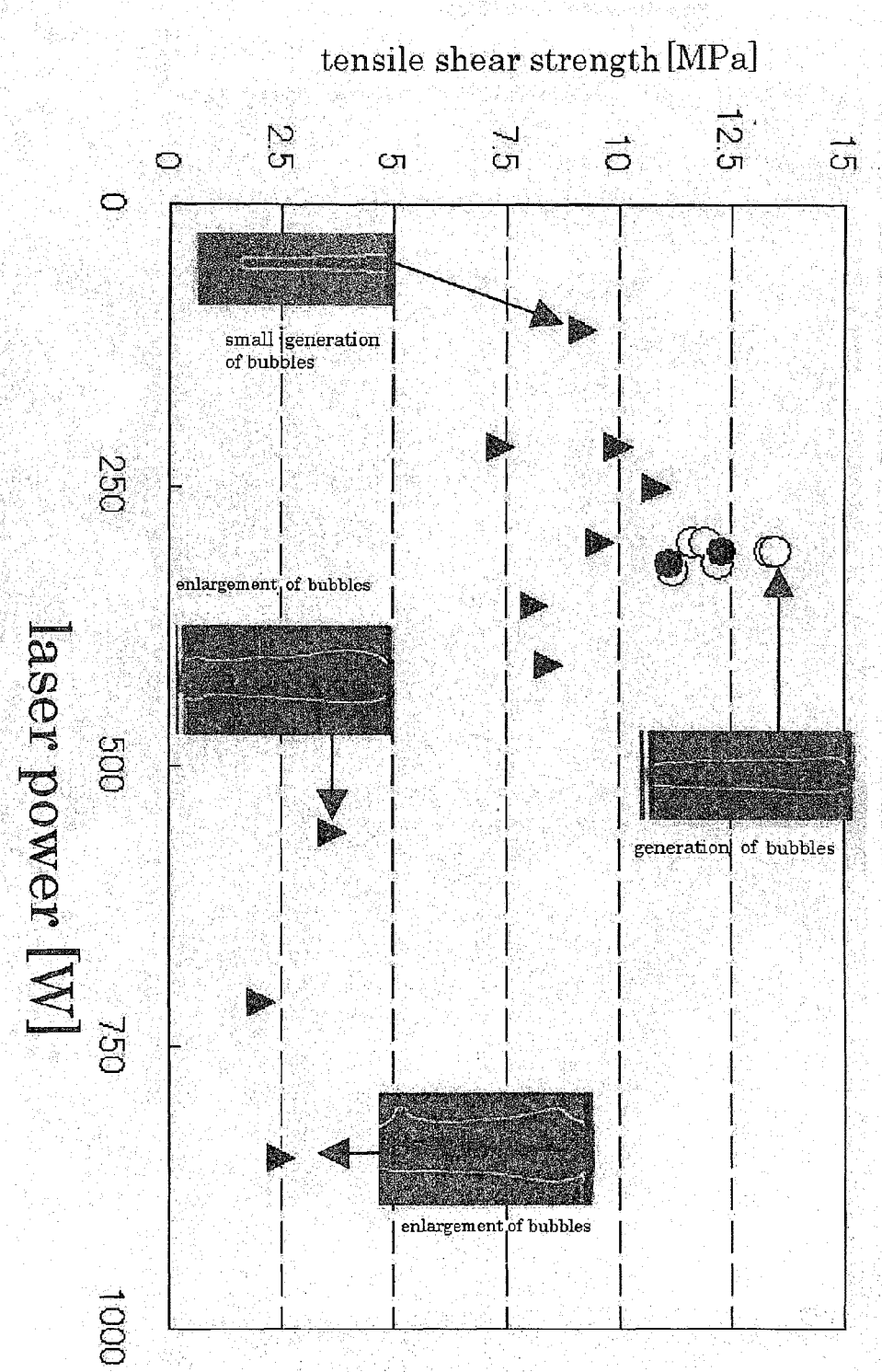

[Fig. 14]
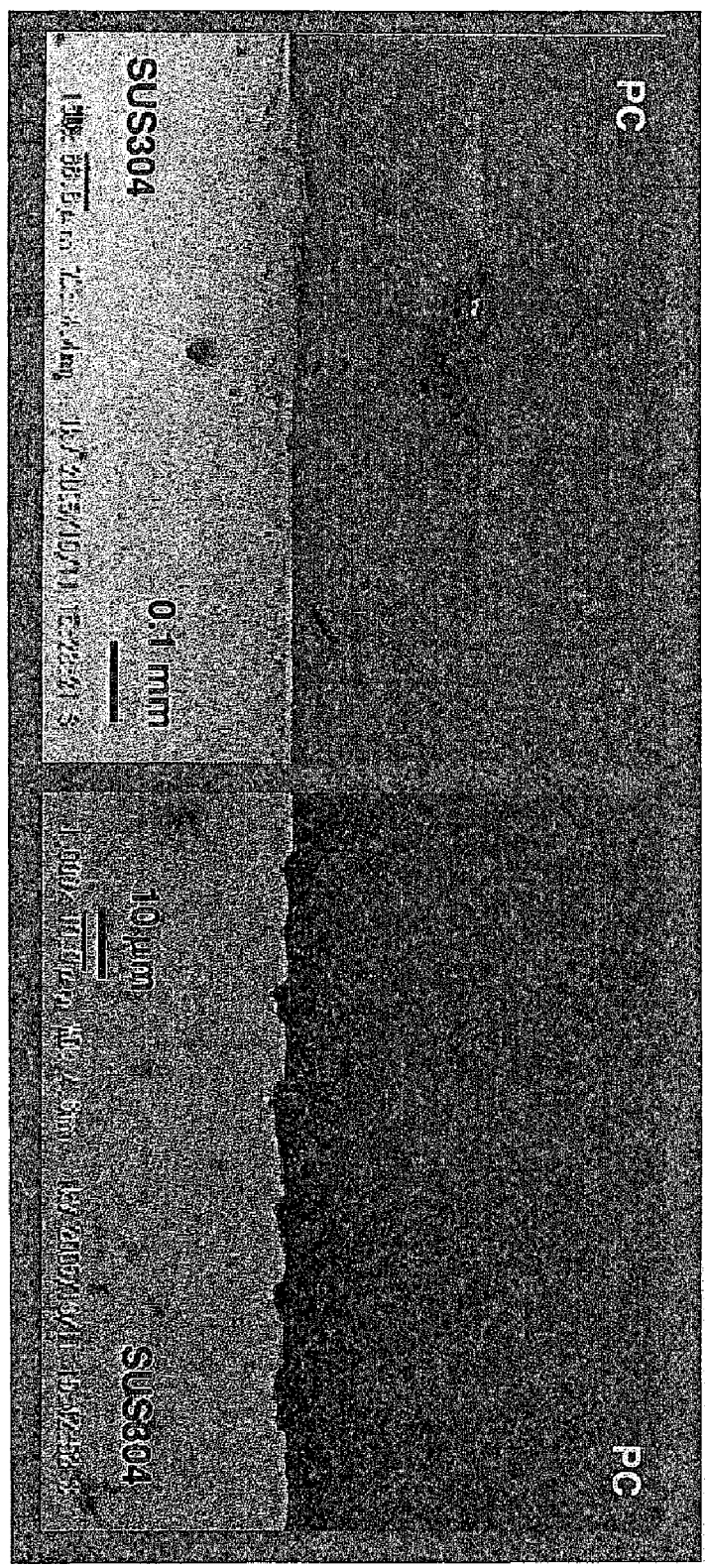

METHOD FOR METAL-RESIN JOINING AND A METAL-RESIN COMPOSITE, A METHOD FOR GLASS-RESIN JOINING AND A GLASS-RESIN COMPOSITE, AND A METHOD FOR CERAMIC-RESIN JOINING AND A CERAMIC-RESIN COMPOSITE

TECHNICAL FIELD OF THE INVENTION

The present invention relates to a method for joining a metallic material and a resin material, and a metal-resin composite having a joint joined by the method, and particularly relates to a method for joining a metallic material and a resin material which can form a strong joint by heating the portion to be joined between the metallic material and the resin material to a specific temperature. Furthermore, the present invention also relates to a method for glass-resin joining and a glass-resin composite, and to a method for ceramic-resin joining and a ceramic-resin composite.

BACKGROUND ART

As conventional methods for joining a metallic material and a resin material, a method using rivet fastening and a method using adhesives are exemplified. Rivet fastening is a physical fastening method comprising knocking a rivet having a diameter of several millimeters to several tens of millimeters into a metallic material and a resin material in a state wherein they are superposed each other so as to penetrate the materials to fix the materials. On the other hand, adhesion is a method comprising fixing a metallic material and a resin material by physical adsorption force and chemical adsorption force via an adhesive.

For joining using laser, a method for joining metallic materials or resin materials by welding and deposition is practically used, but joining between a metallic material and a resin material has not been effected yet. However, in recent years, in laser resin joining, an innovative method for joining by superposing a material being transparent relative to the wavelength of laser light and a material being opaque relative to the wavelength of laser light each other, and irradiating the materials with laser light from the side of the transparent material so that only the portion to be joined is melted, has been put into practical use. In this method, a large joint area can be obtained and generation of gas due to decomposition of the resin during heating can be suppressed [see Japanese Patent Application Laid-open (JP-A) No. 2003-325710, JP-A-60-214931, JP-A-2002-67165, and Proceedings of the 59th Laser Materials Processing Conference, pp. 1-7 (September 2003)].

There is a very strong demand for joining a metallic material and a resin material. This is because, by using a metallic material only in a desired portion and replacing the residual portion with a resin material, various merits can be obtained: the weight and cost can be largely reduced because a resin material weighs and costs not more than half that of a metallic material; freedom of designing with regard to excellent electric and heat characteristics due to insulator resin materials is improved; or that a novel composite functional material is produced by combining them.

However, the field of application is limited under the current situation in the method using rivet fastening or an adhesive, which is a conventional method for joining a metallic material and a resin material. Rivet fastening is mainly applied to large or simple commercial products or parts because the fastening portion has a considerable size and weight and the size and weight of parts are necessarily increased and the freedom of designing is decreased. On the other hand, in adhesion, the size and weight are not increased, but there are technical problems that precise pinpoint joining is difficult because the adhesive is wet and extended, that the surface to be adhered is restricted, for example, adhesive strength on an uneven surface is higher than that on a plane surface, and that production tact is decreased due to long cure time and maintenance and control of the state of the adhesive are difficult during production. In the joining using laser, selection of materials is limited since a resin material being transparent relative to the laser wavelength and a resin material being opaque relative to the laser wavelength must be used as in the joining of resins, and there is a problem in manufactural technology that laser irradiation can be effected only from the transparent resin material side. The same problems also exist in joining of a glass material and a resin material and joining of a ceramic material and a resin material.

DISCLOSURE OF THE INVENTION

Problems that the Invention is to Solve

The present invention was conceived in view of such conventional technical problems, and an object of the invention is to provide a method for joining a metallic material and a resin material, a method for joining a glass material and a resin material, and a method for joining a ceramic material and a resin material, that have no limitation in their field of application and that can form a strong joint by an easy method, as well as a metal-resin composite, a glass-resin composite and a ceramic-resin composite each having a strong joint joined by such methods.

Means for Solving the Problems

The present inventors have done intensive studies so as to solve the above-mentioned problems, and reached the following findings.

In the method for metal-resin joining, the portion to be joined between the metallic material and the resin material is heated in such a state that the metallic material and the resin material are coupled, to the extent that gas due to heat decomposition from the interior portion of the resin material is expanded to generate bubbles in the interior portion of the resin. At that time, explosive pressure due to generation of bubbles is applied to the joint, although it occurs in the micro size region, and the temperature of the portion to be joined between the metallic material and the resin material is high, whereby the resin material around the bubbles and the metallic material satisfy the condition that enables physical joining such as anchor effect or chemical joining via a metal oxide, to form a joint. Furthermore, when the resin material is cooled and solidified, the temperature of the bubbles is also decreased, whereby the pressure in the bubbles is decreased and suction force is generated. The metal-resin joining is enabled by the combination of these joining forces. Moreover, use of laser light as a heating source enables topical rapid heating and rapid cooling, can increase pressure and adsorption force associated with generation of bubbles, and can promote joining between the metallic material and the resin material. The same as the method for metal-resin joining applies to the method for glass-resin joining and to the method for ceramic-resin joining.

More specifically, the present invention comprises the constitutions of the following (1) to (30).

(1) A method for joining a metal material and a resin material, characterized in that joining is effected by heating a portion to be joined, in such a state that the metallic material is coupled with the resin material, to a temperature at which bubbles are generated in the resin material at the portion to be joined.

(2) The method for metal-resin joining according to the above-mentioned (1), wherein the heating temperature is not less than the softening temperature of the resin and less than the boiling point of the metal.

(3) The method for metal-resin joining according to the above-mentioned (1), wherein the heating temperature is from 200° C. to 1500° C. at the portion to be joined.

(4) The method for metal-resin joining according to any of the above-mentioned (1) to (3), wherein the heating temperature is a temperature at which the bubbles in the resin do not transfer from the vicinity of the portion to be joined.

(5) The method for metal-resin joining according to any of the above-mentioned (1) to (4), wherein the sphere equivalent diameter of the bubbles generated in the resin material at the portion to be joined is not more than 5 mm.

(6) The method for metal-resin joining according to any of the above-mentioned (1) to (4), wherein the sphere equivalent diameter of the bubbles generated in the resin material at the portion to be joined is from 0.01 mm to 1 mm.

(7) The method for metal-resin joining according to any of the above-mentioned (1) to (6), wherein the resin material is thermoplastic resin material.

(8) The method for metal-resin joining according to any of the above-mentioned (1) to (7), wherein a laser light source is used as a heating source for heating the portion to be joined.

(9) A metal-resin composite, characterized in that the composite has a joint formed by joining a metallic material and a resin material by the method for metal-resin joining according to any of the above-mentioned (1) to (8).

(10) The metal-resin composite according to the above-mentioned (9), wherein the tensile shear strength at the joint is not less than 5 MPa.

(11) A method for joining a glass material and a resin material, characterized in that joining is effected by heating a portion to be joined, in such a state that the glass material is coupled with the resin material, to a temperature at which bubbles are generated in the resin material at the portion to be joined.

(12) The method for glass-resin joining according to the above-mentioned (11), wherein the heating temperature is not less than the softening temperature of the resin and less than the boiling point of the glass.

(13) The method for glass-resin joining according to the above-mentioned (11), wherein the heating temperature is from 200° C. to 1500° C. at the portion to be joined.

(14) The method for glass-resin joining according to any of the above-mentioned (11) to (13), wherein the heating temperature is a temperature at which the bubbles in the resin do not transfer from the vicinity of the portion to be joined.

(15) The method for glass-resin joining according to any of the above-mentioned (11) to (14), wherein the sphere equivalent diameter of the bubbles generated in the resin material at the portion to be joined is not more than 5 mm.

(16) The method for glass-resin joining according to any of the above-mentioned (11) to (14), wherein the sphere equivalent diameter of the bubbles generated in the resin material at the portion to be joined is from 0.01 mm to 1 mm.

(17) The method for glass-resin joining according to any of the above-mentioned (11) to (16), wherein the resin material is thermoplastic resin material.

(18) The method for glass-resin joining according to any of the above-mentioned (11) to (17), wherein a laser light source is used as a heating source for heating the portion to be joined.

(19) A glass-resin composite, characterized in that the composite has a joint formed by joining a glass material and a resin material by the method for glass-resin joining according to any of the above-mentioned (11) to (18).

(20) The glass-resin composite according to the above-mentioned (19), wherein the tensile shear strength at the joint is not less than 5 MPa.

(21) A method for joining a ceramic material and a resin material, characterized in that joining is effected by heating a portion to be joined, in such a state that the ceramic material is coupled with the resin material, to a temperature at which bubbles are generated in the resin material at the portion to be joined.

(22) The method for ceramic-resin joining according to the above-mentioned (21), wherein the heating temperature is not less than the softening temperature of the resin and less than the boiling point of the ceramic.

(23) The method for ceramic-resin joining according to the above-mentioned (21), wherein the heating temperature is from 200° C. to 1500° C. at the portion to be joined.

(24) The method for ceramic-resin joining according to any of the above-mentioned (21) to (23), wherein the heating temperature is a temperature at which the bubbles in the resin do not transfer from the vicinity of the portion to be joined.

(25) The method for ceramic-resin joining according to any of the above-mentioned (21) to (24), wherein the sphere equivalent diameter of the bubbles generated in the resin material at the portion to be joined is not more than 5 mm.

(26) The method for ceramic-resin joining according to any of the above-mentioned (21) to (24), wherein the sphere equivalent diameter of the bubbles generated in the resin material at the portion to be joined is from 0.01 mm to 1 mm.

(27) The method for ceramic-resin joining according to any of the above-mentioned (21) to (26), wherein the resin material is thermoplastic resin material.

(28) The method for ceramic-resin joining according to any of the above-mentioned (21) to (27), wherein a laser light source is used as a heating source for heating the portion to be joined.

(29) A ceramic-resin composite, characterized in that the composite has a joint formed by joining a ceramic material and a resin material by the method for ceramic-resin joining according to any of the above-mentioned (21) to (28).

(30) The ceramic-resin composite according to the above-mentioned (29), wherein the tensile shear strength at the joint is not less than 5 MPa.

Advantages of the Invention

The method for joining of the present invention enables strong joining between a metallic material, a glass material or a ceramic material and a resin material. Specifically, by heating the interior portion of the resin material using a laser light source, an ionizing radiation source or the like as a heating source, fine bubbles are generated in the resin and the resin has a structure enclosing bubbles, whereby the pressure and suction force resulting from generation of bubbles can be increased, and strong joining between the metallic material, the glass material or the ceramic material and the resin material can be accelerated.

Furthermore, many advantages are provided by using a laser light source, an ionizing radiation source or the like as a heating source. Firstly, since the laser light source and the ionizing radiation source allow topical heating, they can make a small joint. Therefore, a joint having a size of a rivet and the rivet itself used in rivet fastening become unnecessary, which can prevent a joint from becoming large and heavy. Secondly, in the method for joining using an adhesive, precise pinpoint joining is difficult because the adhesive is wet and extended, whereas a laser light source, for example, can decrease the beam diameter to the order of micron, a precise and fine joint can therefore be obtained. Thirdly, since the adsorption force generated during cooling and solidification of the resin material acts more advantageously as the surface becomes plane, limitation of the joining surface can also be alleviated. Fourthly, the time of irradiation of laser light required for joining is shorter than the time required for curing an adhesive, and the time does not act as a step for rate-limiting the production. Furthermore, when the joining is effected using laser light, occurrence of oxidation and deterioration can sometimes be suppressed more than the case of joining by an adhesive, which makes maintenance and control relatively easy. Fifthly, by selecting the wavelength of laser light that permeates a resin material or the ionizing radiation source, heating can be effected either from the side of a metallic material, a glass material or a ceramic material, or from the side of a resin material, which eliminates limitation on the direction of application of heat by a heating source. This is very advantageous in view of manufacturing technique since freedom of designing and freedom of selection of materials are increased. In fact, in the joining of resin materials using laser light, limitation that laser light can be irradiated only from one side sometimes exists.

BRIEF DESCRIPTION OF THE DRAWINGS

FIG. 1 shows the constitution of the method for joining of Example 1.

FIG. 2 is a schematic view of the joining process at the initial stage of laser irradiation in the method for joining of Example 1.

FIG. 3 is a schematic view of the joining process during generation of bubbles in the method for joining of Example 1.

FIG. 4 is a schematic view of the joining process immediately after laser irradiation in the method for joining of Example 1.

FIG. 5 shows a joint formed by the method for joining of Example 1.

FIG. 6 shows the constitution of the method for joining of Example 2.

FIG. 7 is a schematic view of the joining process at the initial stage of laser irradiation in the method for joining of Example 2.

FIG. 8 is a schematic view of the joining process during generation of bubbles in the method for joining of Example 2.

FIG. 9 is a schematic view of the joining process immediately after laser irradiation in the method for joining of Example 2.

FIG. 10 shows a joint formed by the method for joining of Example 2.

FIG. 11 shows a surface appearance of a joint in the method for joining of Example 3.

FIG. 12 is a graph showing a tensile shear loading of a joint in the method for joining of Example 3.

FIG. 13 is a graph showing a tensile shear strength of a joint in the method for joining of Example 3.

FIG. 14 is a scanning electron microscope photograph of a joint in the method for joining of Example 4.

| | Explanation of Reference Signs in Drawings |
|---|---|
| 1: | fiber laser oscillator |
| 2: | fiber |
| 3: | laser processing head |
| 4: | fiber laser light |
| 5: | light focus lens |
| 6: | workpiece |
| 7: | workpiece |
| 8: | clamp |
| 9: | heat transfer |
| 10: | boundary portion between the workpiece 6 and the workpiece 7 |
| 11: | bubbles |
| 12: | pressure generated due to generation of the bubbles 11 |
| 13: | force to suck |
| 14: | joint |
| 15: | YAG laser oscillator |
| 16: | processing head |
| 17: | YAG laser light |
| 18: | light focus lens |
| 19: | workpiece |
| 20: | workpiece |
| 21: | heat transfer |
| 22: | boundary portion between the workpiece 19 and the workpiece 20 |
| 23: | bubbles |
| 24: | pressure generated due to generation of the bubbles 22 |
| 25: | force to suck |
| 26: | joint |

BEST MODE FOR CARRYING OUT THE INVENTION

Hereinafter, the present invention is specifically described.

Examples of the metallic material used in the method of the present invention may include, but are not limited to, iron, aluminum, titanium, copper and the like, and alloys thereof. However, metallic materials having a low boiling point such as magnesium and alloys thereof are not preferable since sufficient heat may not be input to the portion to be joined. In the present invention, metallic materials made from carbon steel, stainless steel, a titanium alloy and the like, wherein the portion to be joined can be heated rapidly to high temperature, are particularly preferable. Metallic materials on which surface treatment has been effected for increasing the joining force with a resin material are preferable. In addition, in the case of austenite stainless steel SUS304, it has been acknowledged that a joint of high strength could be obtained in a receiving material having an unpolished surface, and that, as a result of the experiments done by the present inventors, the surface roughness of the metallic material to be joined affected little on the joining strength of the joint in some cases. The thickness of the metallic material is not particularly limited, and the metallic material may be one having a thickness of not less than 0.1 mm, further a thickness of not less than 1 mm, further a thickness of not less than 3 mm.

As the glass materials used in the method of the present invention, the followings are exemplified in view of classification based on chemical components. That is, examples may include, but are not limited to, "soda glass" made from silicic acid, soda ash and lime, "lead glass" made from silicic acid, calcium carbonate and lead oxide, "borosilicate glass" made from silicic acid, boric acid and soda ash, and the like. The thickness of the glass material is not particularly limited, and the glass material may be one having a thickness of not less than 0.1 mm, further a thickness of not less than 1 mm, further a thickness of not less than 3 mm.

As the ceramic material used in the method of the present invention, the followings are exemplified in view of composition. That is, examples may include, but are not limited to, oxide-type materials such as alumina and zirconia, carbide-type materials such as silicic carbide, nitride-type materials such as silicon nitride, as well as other carbonate-type, phosphate-type, hydroxide-type, halide-type and element-type materials. The thickness of the ceramic material is not particularly limited, and the ceramic material may be one having a thickness of not less than 0.1 mm, further a thickness of not less than 1 mm, further a thickness of not less than 3 mm.

The resin material used in the method of the present invention must be a resin and/or a resin precursor that is fluidized under a heat source. Specific kinds of the resin to be used may include thermoplastic resins, for example, polyamide resins (PA) such as nylon 6 (PA6) and nylon 66 (PA66), polyester resins such as polyethylene terephthalate (PET) and polybutylene terephthalate (PBT), polycarbonate (PC) resins, styrene resins such as polystyrene and ABS, acrylic resins (PMMA and the like) and the like. Particularly, resin materials having polar groups or groups that are reactive with a metal in the main chain, side chains and/or termini are preferable, and polyamide resins (PA), polyester resins, polycarbonates (PC), and styrene resins and acrylic resins having polar groups such as carboxylic acid groups and sulfonic acid metal salt groups or groups that are reactive with a metal, glass or ceramic in the side chains and/or termini are preferable. Particularly, a resin material comprising an amorphous resin having polar groups or groups that are reactive with a metal, glass or ceramic in the main chain, side chains and/or termini is preferable. Furthermore, the resin material preferably comprises oxygen in the constitutional atoms since the material can readily form chemical bonds with the oxides on the surface of the metal, glass or ceramic to provide high joining strength. In addition, the resin material used in the present invention may optionally include reinforce fibers such as glass fibers and carbon fibers, a coloring material, a heat stabilizer, a light stabilizer, and the like.

Moreover, the resin material used in the method of the present invention must be a resin material that generates bubbles by heating, particularly by heating using a laser light source, an ionizing radiation source or the like. For example, a resin material is used that generates bubbles due to generation of gas by heating of moisture in the resin material that has absorbed moisture, or due to generation of gas by decomposition of the resin material under high temperature. The thickness of the resin material is not particularly limited, and the resin material may be one having a thickness of not less than 0.1 mm, further a thickness of not less than 1 mm, further a thickness of not less than 3 mm.

In the method of the present invention, the metallic material, the glass material or the ceramic material and the resin material can be strongly joined by heating the portion to be joined in such a state that the materials are coupled, by laser light, ionizing radiation or the like. The heating temperature at the portion to be joined must be a temperature at which fine bubbles are generated in the interior portion of the resin material, specifically not less than the softening temperature of the resin and less than the boiling point of the metal, glass or ceramic, and preferably 200° C. to 1500° C. at the portion to be joined. Furthermore, the heating temperature is preferably not such high temperature that the bubbles in the resin transfer from the vicinity of the joint. This is because, when the bubbles in the resin transfer, joining by pressure due to generation of bubbles and heat at the portion to be joined cannot be expected. In addition, the upper limit of the sphere equivalent diameter of the bubbles generated upon heating in the resin at the portion to be joined is not more than 5 mm, preferably not more than 3 mm, more preferably not more than 1 mm, and particularly preferably not more than 0.5 mm in view of joining strength and appearance. The lower limit is not less than 0.0001 mm, preferably not less than 0.001 mm, and more preferably not less than 0.01 mm in view of joining strength.

As the heating source for the portion to be joined used in the method of the present invention, a laser light source, an ionizing radiation source and the like are preferable. As the laser light source, for example, YAG laser, fiber laser, laser diode, carbon dioxide gas laser and the like can be used. As the ionizing radiation source, for example, an electron beam, a γ-ray, an X-ray and the like can be used, and the electron beam is particularly preferable. Furthermore, irradiation by these heating sources may be effected by either successive irradiation or pulse irradiation.

When the laser light source is used, the conditions of irradiation such as power of laser, power density, processing speed (traveling speed), and defocusing distance can be suitably set according to the intended purpose. For example, the power density of laser is preferably from $1$ W/mm$^2$ to $10$ kW/mm$^2$. Furthermore, it is preferable to set the condition at which fine bubbles are generated only in the resin material in the vicinity of the joint surface between the metallic material, the glass material or the ceramic material and the resin material. Specifically, when the power of laser is increased, the temperature at the portion to be joined is increased, the subsequent cooling is delayed and the bubbles that are generated in the resin become large, while when the power is decreased, no bubble is generated in the resin or the bubbles are extremely decreased, and the joining strength is decreased. The joining strength is increased by allowing rapid generation of appropriate sizes of bubbles so that the resin in a molten state can be tightly adhered to the surface of the metal, glass or ceramic. Furthermore, by increasing the defocusing distance of laser, the power density is decreased, whereby high power laser that covers such distance can be irradiated, which leads to a good joint in a broad range of conditions and easy control. Moreover, by increasing the traveling speed of laser, the range of laser power in which preferable joining can be obtained is broaden, which leads to easy control. In addition, a strong joint can be formed by irradiating laser in the direction either from the side of the metallic material, the glass material or the ceramic material or from the side of the resin material in such a state that these materials are coupled.

In the method of the present invention, by heating the portion to be joined between the metallic material, the glass material or the ceramic material and the resin material in such a state that the metallic material, the glass material or the ceramic material and the resin material are coupled, the gas generated by heat decomposition from the interior portion of the resin material is expanded, whereby fine bubbles are generated in the interior portion of the resin. While the principle is not clear, it is believed that explosive pressure associated with generation of the bubbles is applied to the portion to be joined in the microsize region in this situation, which is combined with high temperature of the metallic material, the glass material or the ceramic material and the resin material at the portion to be joined, whereby the resin material in the vicinity of bubbles and the metallic material, the glass material or the ceramic material satisfy the condition under which the metallic material, the glass material or the ceramic material and the resin material can be joined by physical joining force such as anchor effect and/or chemical joining force via the oxide on the metal, glass or ceramic, to form a joint. Furthermore, when the resin material is cooled and solidified, the temperature of bubbles is also decreased, whereby the pressure in the bubbles is decreased and suction force is generated. The combination of these joining forces enables strong joining between the metal, glass or ceramic and the resin. Moreover, use of laser light as a heating source enables topical rapid heating and rapid cooling, can increase pressure and suction force associated with generation of bubbles, and can promote joining between the metallic material, the glass material or the ceramic material and the resin material. The composite in which the metallic material, the glass material or the ceramic material and the resin material have been joined according to the method of the present invention can possess a strong joint having a tensile shear strength of not less than 1 MPa, more specifically, not less than 5 MPa, and more specifically, not less than 10 MPa.

EXAMPLES

Hereinafter, the method of the present invention is specifically described by Examples. However, the present invention is not limited by these Examples in any way.

The measurement procedures for the physical characteristics of the joint between the metallic material, the glass material or the ceramic material and the resin material measured in the Examples are shown below.

1. Temperature at the Joint

The temperature at the joint was obtained by actually measuring the surface temperature of the joint on the side of the metal, glass or ceramic using R (platinum-platinum rhodium: Pt—Pt 13% Rh) or K (alumel-chromel) thermocouple.

2. Sphere Equivalent Diameter of the Bubbles at the Joint

The bubbles were observed and measured using a stereomicroscope. The joint was observed using a stereomicroscope and photographs were taken (the photographs were scanned into a computer display). Furthermore, the standard size (0.1 mm, 0.5 mm, and 1 mm) was also observed and scanned into the computer display. The sphere equivalent diameter for each of the air bubbles was measured by image analysis by comparing the bubble and the standard size.

3. Joining Strength of the Joint (Tensile Shear Strength and State of Breakage)

A plate of a metallic material and a plate of a resin material (each had a length of 70 mm× a width of 30 mm× a thickness (see the following)) were prepared. A test piece for tensile shear test was prepared by superposing the two plates each other and joining 50 mm of the length of 70 mm while leaving 20 mm as holding portions for tensile test. The holding portions for test (each 10 mm) of the metallic material, the glass material or the ceramic material and the resin material were clipped by upper and lower chucks of a tensile tester (maximum loading: 1 ton). The materials were pulled each other at the speed of 5 mm/min to give a loading-elongation curve, and the maximum loading at breakage was measured, which was considered to be the tensile shear strength. Furthermore, during the measurement, whether the breakage occurred at the body material of the resin material other than the joint (breakage at the body material) or at the joint (breakage at the joint) was also observed. It is shown that the joint strength was extremely high where the breakage occurred at the body material other than the joint (breakage at the body material).

Example 1

Hereinafter, Examples of the present invention are described with reference to the drawings.

FIG. 1 is a view that shows the constitution of the method for a metal-resin joining of Example 1. As shown in FIG. 1, fiber laser light 4 having a wavelength of 1090 nm was introduced to a laser processing head 3 from a fiber laser oscillator 1 via a fiber 2 and focused by a light focus lens 5 having a focal point distance of 80 mm. At the position 15 mm away from the position in the focal point in the direction away from the lens, a metallic material which is a workpiece 6 (pure titanium), and a resin material which is a workpiece 7 (polycarbonate, "Novaflex 7025IR" manufactured by Mitsubishi Engineering-Plastics Corporation, glass transition temperature=150° C. (Tmg compliant with the DSC method JIS K 7121), loading deflection temperature under loading of catalogue value=129° C. (loading: 1.80 MPa)/142° C. (loading: 0.45 MPa), compliant with ISO 75-1, 75-2) were superposed each other and fixed by a clamp 8, and traveled at the traveling speed of 3 mm/s during irradiation of the laser light 4 having the power of 30 W. During that period, the workpiece 7, polycarbonate, was positioned at the side of the light focus lens 5 (at the side of the heating source). The workpiece 6, pure titanium, is in the form of a plate having a thickness of 1 mm, and the workpiece 7, polycarbonate, is in the form of a plate having a thickness of 0.5 mm. When the laser light 4 is irradiated to the workpiece 7, as shown in FIG. 2, the laser light 4 permeates the workpiece 7, and the workpiece 6, pure titanium, which has a high absorption ratio relative to the wavelength of the laser light 4, is mainly heated, whereby a boundary portion 10 between the workpiece 6 and the workpiece 7 and the periphery thereof are heated by heat transfer 9 from the workpiece 6 to the workpiece 7. As a result, as shown in FIG. 3, heat decomposition occurs in the interior portion of the polycarbonate of workpiece 7 and gas is generated, whereby bubbles 11 are formed. During this period, pressure 12 is generated due to generation of the bubbles 11. Also, the metallic material of the workpiece 6 is heated to less than the boiling point and the resin material in the workpiece 7 is heated to not less than the softening temperature. By these two factors, the resin material of the workpiece 7 and the metallic material of the workpiece 6 satisfy the condition that enables physical joining such as anchor effect, or chemical joining via a metal oxide, at the periphery of the bubbles 11, to form a joint. Furthermore, when the irradiation of the laser light 4 is stopped, the bubbles 11 are rapidly cooled, the pressure 12 is decreased, and force 13 to suck titanium of the workpiece 6 is generated as shown in FIG. 4. These joining forces were combined to form a metal-resin joint 14 as shown in FIG. 5. The metal-resin joint 14 was characterized by having the bubbles 11 (sphere equivalent diameter: about 0.01 to 1 mm) at the joint. Furthermore, the joining strength and breakage state of the joint were investigated. The breakage occurred at the body material portion other than the joint of the resin material, and the tensile shear strength was 23 MPa.

Example 2

FIG. 6 is a view that shows the constitution of the method for a metal-resin joining of Example 2. As shown in FIG. 6, YAG laser light 17 having a wavelength of 1064 nm was introduced to a laser processing head 16 from a YAG laser oscillator 15 via a fiber 2 and focused by a light focus lens 18 having a focal point distance of 200 mm. At the position 30 mm away from the position in the focal point in the direction away from the lens, a metallic material which is a workpiece 19 (stainless steel SUS 304), and a resin material which is a workpiece 20 (PA12 amorphous polyamide, "T-714H" manufactured by Toyobo Co., Ltd., glass transition temperature=160° C. (Tmg compliant with the DSC method JIS K 7121), loading deflection temperature under loading=130° C.

(loading: 1.80 MPa)/145° C. (loading: 0.45 MPa), compliant with ISO 75-1, 75-2) were superposed each other and fixed by a clamp 8, and traveled at the traveling speed of 30 mm/s during irradiation of the laser light having the power of 1000 W. During that period, the workpiece 19, metallic material stainless steel SUS 304, was positioned at the side of the light focus lens 18. The workpiece 19, stainless steel SUS 304, is in the form of a plate having a thickness of 3 mm, and the workpiece 20, T-714H, is in the form of a plate having a thickness of 2 mm. When the laser light 17 is irradiated to the workpiece 19, as shown in FIG. 7, the laser light 17 is absorbed by the workpiece 19, stainless steel SUS 304, whereby a boundary portion 22 between the workpiece 19 and the workpiece 20 and the periphery thereof are heated by heat transfer 21. As a result, as shown in FIG. 8, bubbles 23 are formed by the gas generated in the interior portion of T-714H of the workpiece 20. During this period, pressure 24 is generated due to generation of the bubbles 23. Also, the metallic material of the workpiece 19 is heated to less than the boiling point and the resin material in the workpiece 20 is heated to not less than the softening temperature. By these two factors, the resin material of the workpiece 20 and the metallic material of the workpiece 19 satisfy the condition that enables physical joining such as anchor effect, or chemical joining via a metal oxide, at the periphery of the bubbles 23, to form a joint. Furthermore, when the irradiation of the laser light 17 is stopped, the bubbles 23 are rapidly cooled, the pressure 24 is decreased, and force 25 to suck stainless steel SUS 304 of the workpiece 19 is generated as shown in FIG. 9. These joining forces were combined to form a metal-resin joint 25 as shown in FIG. 10. The metal-resin joint 25 was characterized by having the bubbles 23 (sphere equivalent diameter: about 0.01 to 3 mm) at the joint. Furthermore, the joining strength and breakage state of the joint were investigated. The breakage occurred at the body material portion other than the joint of the resin material, and the tensile shear strength was 21 MPa.

Example 3

The portion to be joined of the metallic material and the resin material was heated in a method similar to that of Example 1 under the following conditions. The surface appearance and state of the bubbles at the joint were observed while changing laser power, and the tensile shear loading and the tensile shear strength of the joint were also measured.

Metallic material: stainless steel SUS 304 plate (thickness: 2 mm)

Resin material: PA12 amorphous polyamide plate ("T-714H" manufactured by Toyobo Co., Ltd.) (thickness: 2 mm)

Material at heating source side: resin material
Heating source: YAG laser
Power (changed between 0 to 1000 W)
Defocusing distance: 20 mm (beam diameter: 5 mm)
Traveling speed: 10 mm/s The surface appearance (power: 110 W, 300 W, 560 W and 850 W) of the joint when the laser power was changed is shown in FIG. 11. As is apparent from FIG. 11, the bubbles of the resin material began to generate at the laser power of 110 W, and when the power was increased, bubbles having sphere equivalent diameter of 0.01 mm to 0.5 mm were generated at 300 W or more, and the bubbles then became enlarged as the power was increased. Joining between the resin material and the metallic material was confirmed in all joints in which bubbles were generated.

Furthermore, graphs each showing the tensile shear loading and the tensile shear strength at the joint when the laser power was changed between 0 to 1000 W are shown in FIGS. 12 and 13. As is apparent from FIGS. 12 and 13, when the laser power is low, at which bubbles were hardly generated, the tensile shear loading and the tensile shear strength at the joint were both low, whereas an extremely high tensile shear strength was obtained at the joint when moderate sizes of bubbles were generated with increase of the laser power. However, when the laser power was too high, the bubbles became enlarged, and the tensile shear strength was contrarily decreased. In addition, as shown in FIG. 12, the joint in which moderate sizes of bubbles were generated showed breakage at the body material in the tensile shear strength measurement test, whereas the joint in which generation of the bubbles was insufficient or the joint in which the bubbles became enlarged showed breakage at the joint. The tensile shear strength of the joint at each laser power was as shown in Table 1.

Secondly, in order to confirm the joining phenomenon between the metallic material and the resin material, the state of the resin material at the portion to be joined when the temperature of the portion to be joined was changed by changing laser power was photographed using a metal microscope. When the surface temperature of the portion to be joined was 570° C., a small amount of bubbles (sphere equivalent diameter: 0.01 to 0.1 mm) could be confirmed in the resin; at 790° C., moderate size of bubbles (sphere equivalent diameter: 0.02 to 1.5 mm) were generated in the resin; and at 1200° C., the bubbles in the resin further became enlarged (sphere equivalent diameter: 0.02 to 2.0 mm) and release of gas was confirmed. Furthermore, among these temperatures, the strongest joint was formed when heating was effected to 790° C. (tensile shear strength 22 MPa). Therefore, it can be understood that rapid heating to high temperature by laser and generation of high pressure due to plastic decomposition are necessary to form a strong joint between a metallic material and a resin material, and that it is also important to avoid decreased pressure due to enlarged bubbles.

TABLE 1

| YAG laser power (W) | 110 | 300 | 560 | 850 |
|---|---|---|---|---|
| Temperature of the portion to be joined (° C.) | 570 | 790 | 1200 | >1300 |
| Sphere equivalent diameter of the bubbles (mm) | 0.01-0.1 | 0.02-1.5 | 0.02-2.0 | 0.02-3.0 |
| Tensile shear strength (MPa) | 10 | 22 | 4 | 3 |

Example 4

The portion to be joined between the metallic material and the resin material was heated in a method similar to that of Example 1 under the following conditions. A picture of the joint between these materials was taken using a scanning electron microscope.

Metallic material: stainless steel SUS 304 plate (thickness: 2 mm)

Resin material: polycarbonate ("Novaflex 7025IR" manufactured by Mitsubishi Engineering-Plastics Corporation) (thickness: 0.5 mm)

Material at heating source side: resin material
Heating source: YAG laser
Power: 750 W
Defocusing distance: 30 mm (beam diameter: 7 mm)
Traveling speed: 10 mm/s Bubbles in the resin at the joint: 0.01 mm to 0.3 mm (sphere equivalent diameter)

Tensile shear strength of the joint: 20 MPa

The picture of the joint is shown in FIG. 14. As is apparent from FIG. 14, by heating the joint between the metallic material and the resin material using a laser light source to allow generation of bubbles in the interior portion of the resin material, these materials can be tightly joined at micron-order.

Example 5

The portion to be joined between the metallic material and the resin material was heated in a method similar to that of Example 1 under the following conditions, and the tensile shear strength at the joint between these materials was measured.

Metallic material: stainless steel SUS 304 plate (thickness: 2 mm)

Resin material: PA12 amorphous polyamide plate ("T-714H" manufactured by Toyobo Co., Ltd.) (thickness: 2 mm)

Material at heating source side: resin material

Heating source: laser diode

Power: 200 W

Rectangular beam shape: 1 mm×7 mm

Traveling speed: 2.5 mm/s (Traveled to the direction wherein the width of the joint is widened)

Bubbles in the resin at the joint: 0.01 mm to 0.3 mm (sphere equivalent diameter)

Tensile shear strength of the joint: 50 MPa

Example 6

The portion to be joined between the metallic material and the resin material was heated in a method similar to that of Example 1 under the following conditions. The state of generation of bubbles at the joint between these materials and the sphere equivalent diameter of the bubbles were measured, and the state of breakage (breakage at the body material or breakage at the joint) of the joint during the tensile shear strength test was observed. The results are shown in Table 2.

Metallic material: stainless steel SUS 304 plate (thickness: 2 mm)

The following materials were used with modification for the resin materials (thickness 2 mm):

Nylon 6 (NY6): Toyobo nylon T-800 (manufactured by Toyobo Co. Ltd.)

Nylon 12 (NY12): Daiamide L1801 (manufactured by Daicel-Huls Ltd.)

Polybutylene terephthalate (PBT): ToughTech PBT Nl000 (manufactured by Mitsubishi Rayon Co. Ltd.)

Polyarylate (PAR): U-Polymer U1000 (manufactured by Unitika, Ltd.)

Material at heating source side: resin material

Heating source: YAG laser

Power: 650 W

Defocusing distance: 20 mm (beam diameter: 5 mm)

Traveling speed: 10 mm/s

As shown in Table 2, in all of the resin materials, nylon 6, nylon 12, polybutylene terephthalate and polyarylate, moderate size of bubbles were generated, the joining strength with the metallic material was strong, and breakage occurred at the portion of the body material of the resin rather than the joint during the tensile shear strength test of the joint.

TABLE 2

| Resin material | NY6 | NY12 | PBT | PAR |
|---|---|---|---|---|
| Generation of bubbles | Yes | Yes | Yes | Yes |
| Sphere equivalent diameter of the bubbles (mm) | 0.05-1.0 | 0.01-0.3 | 0.03-1.0 | 0.01-0.5 |
| Breakage condition of the joint | Breakage at the body material | Breakage at the body material | Breakage at the body material | Breakage at the body material |

Example 7

The drawings showing the constitution and process of the method for a glass-resin joining of Example 7 are as same as FIGS. 1 to 5 of Example 1, and this example is described with reference to these drawings. As shown in FIG. 1, fiber laser light 4 having a wavelength of 1090 nm was introduced to a laser processing head 3 from a fiber laser oscillator 1 via a fiber 2 and focused by a light focus lens 5 having a focal point distance of 80 mm. At the position 5 mm away from the position in the focal point in the direction away from the lens, a glass material which is a workpiece 6 (float glass plate made of soda glass), and a resin material which is a workpiece 7 (polycarbonate, "Novaflex 7025IR" manufactured by Mitsubishi Engineering-Plastics Corporation, glass transition temperature=150° C. (Tmg compliant with the DSC method JIS K 7121), loading deflection temperature under loading of catalogue value=129° C. (loading: 1.80 MPa)/142° C. (loading: 0.45 MPa), compliant with ISO 75-1, 75-2) were superposed each other and fixed by a clamp 8, and traveled at the traveling speed of 3 mm/s during irradiation of the laser light 4 having the power of 30 W. During that period, the workpiece 7, polycarbonate, was positioned at the side of the light focus lens 5. The workpiece 6, glass material, is in the form of a plate having a thickness of 3 mm, and the workpiece 7, polycarbonate, is in the form of a plate having a thickness of 0.5 mm. When the laser light 4 is irradiated to the workpiece 7, as shown in FIG. 2, the laser light 4 permeates the workpiece 7, and the workpiece 6, glass material, which has a high absorption ratio relative to the wavelength of the laser light 4, is mainly heated, whereby a boundary portion 10 between the workpiece 6 and the workpiece 7 and the periphery thereof are heated by heat transfer 9 from the workpiece 6 to the workpiece 7. As a result, as shown in FIG. 3, heat decomposition occurs in the interior portion of the polycarbonate of the workpiece 7 and gas is generated, whereby bubbles 11 are formed. During this period, pressure 12 is generated due to generation of the bubbles 11. Also, the glass material of the workpiece 6 is heated to less than the boiling point and the resin material in the workpiece 7 is heated to not less than the softening temperature. By these two factors, the resin material of the workpiece 7 and the glass material of the workpiece 6 satisfy the condition that enables physical joining such as anchor effect, or chemical joining via a glass oxide, at the periphery of the bubbles 11, to form a joint. Furthermore, when the irradiation of the laser light 4 is stopped, the bubbles 11 are rapidly cooled, the pressure 12 is decreased, and force 13 to suck glass material of the workpiece 6 is generated as shown in FIG. 4. These joining forces were combined to form a glass-resin joint 14 as shown in FIG. 5. The glass-resin joint 14 was characterized by having the bubbles 11 (sphere equivalent diameter: about 0.01 to 1 mm) at the joint and its periphery. Furthermore, the joining strength and breakage state of the joint were investigated. The breakage occurred at the body material portion of the resin material in the joint, and the tensile shear strength was not less than 5 MPa.

Example 8

The drawings showing the constitution and process of the method for a glass-resin joining of Example 8 are as same as FIGS. 6 to 10 of Example 2, and this example is described with reference to these drawings. As shown in FIG. 6, YAG laser light 17 having a wavelength of 1064 nm was introduced to a laser processing head 16 from a YAG laser oscillator 15 via a fiber 2 and focused by a light focus lens 18 having a focal point distance of 200 mm. At the position 10 mm away from the position in the focal point in the direction away from the lens, a glass material which is a workpiece 19 (float glass plate made of soda glass), and a resin material which is a workpiece 20 (PA12 amorphous polyamide, "T-714H" manufactured by Toyobo Co., Ltd., glass transition temperature=160° C. (Tmg compliant with the DSC method JIS K 7121), loading deflection temperature under loading=130° C. (loading: 1.80 MPa)/145° C. (loading: 0.45 MPa), compliant with ISO 75-1, 75-2) were superposed each other and fixed by a clamp 8, and traveled at the traveling speed of 30 mm/s during irradiation of the laser light having the power of 1000 W. During that period, the workpiece 19, glass material, was positioned at the side of the light focus lens 18. The workpiece 19, glass material, is in the form of a plate having a thickness of 3 mm, and the workpiece 20, T-714H, is in the form of a plate having a thickness of 2 mm. When the laser light 17 is irradiated to the workpiece 19, as shown in FIG. 7, the laser light 17 is absorbed by the workpiece 19, glass material, whereby a boundary portion 22 between the workpiece 19 and the workpiece 20 and the periphery thereof are heated by heat transfer 21. As a result, as shown in FIG. 8, bubbles 23 are formed by the gas generated in the interior portion of T-714H of the workpiece 20. During this period, pressure 24 is generated due to generation of the bubbles 23. Also, the glass material of the workpiece 19 is heated to less than the boiling point and the resin material in the workpiece 20 is heated to not less than the softening temperature. By these two factors, the resin material of the workpiece 20 and the glass material of the workpiece 19 satisfy the condition that enables physical joining such as anchor effect, or chemical joining via a glass oxide, at the periphery of the bubbles 23, to form a joint. Furthermore, when the irradiation of the laser light 17 is stopped, the bubbles 23 are rapidly cooled, the pressure 24 is decreased, and force 25 to suck glass material of the workpiece 19 is generated as shown in FIG. 9. These joining forces were combined to form a glass-resin joint 25 as shown in FIG. 10. The glass-resin joint 25 was characterized by having the bubbles 23 (sphere equivalent diameter: about 0.01 to 3 mm) at the joint and its periphery. Furthermore, the joining strength and breakage state of the joint were investigated. The breakage occurred at the body material portion of the resin material in the joint, and the tensile shear strength was not less than 5 MPa.

Example 9

The drawings showing the constitution and process of the method for a ceramic-resin joining of Example 9 are as same as FIGS. 1 to 5 of Example 1, and this example is described with reference to these drawings. As shown in FIG. 1, fiber laser light 4 having a wavelength of 1090 nm was introduced to a laser processing head 3 from a fiber laser oscillator 1 via a fiber 2 and focused by a light focus lens 5 having a focal point distance of 80 mm. At the position 20 mm away from the position in the focal point in the direction away from the lens, a ceramic material which is a workpiece 6 (plate made of alumina ($Al_2O_3$) of oxide type), and a resin material which is a workpiece 7 (polycarbonate, "Novaflex 7025IR" manufactured by Mitsubishi Engineering-Plastics Corporation, glass transition temperature=150° C. (Tmg compliant with the DSC method JIS K 7121), loading deflection temperature under loading of catalogue value=129° C. (loading: 1.80 MPa)/142° C. (loading: 0.45 MPa), compliant with ISO 75-1, 75-2) were superposed each other and fixed by a clamp 8, and traveled at the traveling speed of 3 mm/s during irradiation of the laser light 4 having the power of 30 W. During that period, the workpiece 7, polycarbonate, was positioned at the side of the light focus lens 5. The workpiece 6, ceramic material, is in the form of a plate having a thickness of 1 mm, and the workpiece 7, polycarbonate, is in the form of a plate having a thickness of 0.5 mm. When the laser light 4 is irradiated to the workpiece 7, as shown in FIG. 2, the laser light 4 permeates the workpiece 7, and the workpiece 6, ceramic material, which has a high absorption ratio relative to the wavelength of the laser light 4, is mainly heated, whereby a boundary portion 10 between the workpiece 6 and the workpiece 7 and the periphery thereof are heated by heat transfer 9 from the workpiece 6 to the workpiece 7. As a result, as shown in FIG. 3, heat decomposition occurs in the interior portion of the polycarbonate of the workpiece 7 and gas is generated, whereby bubbles 11 are formed. During this period, pressure 12 is generated due to generation of the bubbles 11. Also, the ceramic material of the workpiece 6 is heated to less than the boiling point and the resin material in the workpiece 7 is heated to not less than the softening temperature. By these two factors, the resin material of the workpiece 7 and the ceramic material of the workpiece 6 satisfy the condition that enables physical joining such as anchor effect, or chemical joining via a ceramic oxide, at the periphery of the bubbles 11, to form a joint. Furthermore, when the irradiation of the laser light 4 is stopped, the bubbles 11 are rapidly cooled, the pressure 12 is decreased, and force 13 to suck ceramic material of the workpiece 6 is generated as shown in FIG. 4. These joining forces were combined to form a ceramic-resin joint 14 as shown in FIG. 5. The ceramic-resin joint 14 was characterized by having the bubbles 11 (sphere equivalent diameter: about 0.01 to 1 mm) at the joint and its periphery. Furthermore, the joining strength and breakage state of the joint were investigated. The breakage occurred at the body material portion of the resin material in the joint, and the tensile shear strength was not less than 5 MPa.

Example 10

The drawings showing the constitution and process of the method for a ceramic-resin joining of Example 10 are as same as FIGS. 6 to 10 of Example 2, and this example is described with reference to these drawings. As shown in FIG. 6, YAG laser light 17 having a wavelength of 1064 nm was introduced to a laser processing head 16 from a YAG laser oscillator 15 via a fiber 2 and focused by a light focus lens 18 having a focal point distance of 200 mm. At the position 30 mm away from the position in the focal point in the direction away from the lens, a ceramic material which is a workpiece 19 (plate made of alumina ($Al_2O_3$) of oxide type), and a resin material which is a workpiece 20 (PA12 amorphous polyamide, "T-714H" manufactured by Toyobo Co., Ltd., glass transition temperature=160° C. (Tmg compliant with the DSC method JIS K 7121), loading deflection temperature under loading=130° C. (loading: 1.80 MPa)/145° C. (loading: 0.45 MPa), compliant with ISO 75-1, 75-2) were superposed each other and fixed by a clamp 8, and traveled at the traveling speed of 30 mm/s during irradiation of the laser light having the power of 1000 W. During that period, the workpiece 19, ceramic material, was positioned at the side of the light focus lens 18. The workpiece 19, ceramic material, is in the form of a plate having a thickness of 3 mm, and the workpiece 20, T-714H, is in the form of a plate having a thickness of 2 mm. When the laser light 17 is irradiated to the workpiece 19, as shown in FIG. 7, the laser light 17 is absorbed by the workpiece 19, ceramic material, whereby a boundary portion 22 between the workpiece 19 and the workpiece 20 and the periphery thereof are heated by heat transfer 21. As a result, as shown in FIG. 8, bubbles 23 are formed by the gas generated in the interior portion of T-714H of the workpiece 20. During this period, pressure 24 is generated due to generation of the bubbles 23. Also, the ceramic material of the workpiece 19 is heated to less than the boiling point and the resin material in the workpiece 20 is heated to not less than the softening temperature. By these two factors, the resin material of the workpiece 20 and the ceramic material of the workpiece 19 satisfy the condition that enables physical joining such as anchor effect, or chemical joining via a ceramic oxide, at the periphery of the bubbles 23, to form a joint. Furthermore, when the irradiation of the laser light 17 is stopped, the bubbles 23 are rapidly cooled, the pressure 24 is decreased, and force 25 to suck ceramic material of the workpiece 19 is generated as shown in FIG. 9. These joining forces were combined to form a ceramic-resin joint 25 as shown in FIG. 10. The ceramic-resin joint 25 was characterized by having the bubbles 23 (sphere equivalent diameter: about 0.01 to 2 mm) at the joint and its periphery. Furthermore, the joining strength and breakage state of the joint were investigated. The breakage occurred at the body material portion of the resin material in the joint, and the tensile shear strength was not less than 5 MPa.

INDUSTRIAL APPLICABILITY

By using the method for joining according to the present invention, strong joining between a metallic material, a glass material or a ceramic material and a resin material is available. Furthermore, by using a laser light source, an ionizing radiation source or the like as a heating source, there are many advantages such as (1) a small joint can be produced, (2) precise and fine joining at micron-order can be effected, (3) joining on a large area can also be effected, (4) joining can be effected in a short time, (5) oxidation and deterioration of a metal due to an adhesive can sometimes be suppressed, and (6) heating can be effected either from the side of the metallic material, the glass material or the ceramic material or from the side of the resin material, and freedom of designing and selection of materials are increased, which provides advantages to the production of a composite of a metal, glass or ceramic and a resin in the fields of electronics, automobiles, and the like. Particularly, since the joining force between a metallic material, a glass material or a ceramic material and a resin material is high when the method of the present invention is used, the method can also be utilized for joining thick materials each having a thickness of not less than 1.0 mm, more specifically a thickness of not less than 3.0 mm.

The invention claimed is:

1. A method for forming a joint by joining a portion of a metallic material and a portion of a resin material, comprising:

coupling the portion of the metallic material with the portion of the resin material, and fixing by a clamp the portion of the resin material to be joined to the portion of the metallic material to be joined, then heating the portion of the resin material by a laser light source at a temperature that generates fine bubbles in the portion of the resin material to be joined, and wherein the joint obtained has a tensile shear strength of not less than 1 MPa, wherein the metallic material is selected from the group consisting of iron, aluminum, titanium, copper and alloys thereof, wherein the resin material is selected from the group consisting of polyamide resins, polyester resins, and polycarbonate resins, wherein the temperature is at a degree wherein the fine bubbles in the resin material do not transfer from the vicinity of the portion of the resin material to be joined, and wherein the fine bubbles have a sphere equivalent diameter of 0.01 mm to 3 mm.

2. The method for forming a joint according to claim 1, wherein the resin material further comprises at least one resin selected from polycarbonate, nylon 6, nylon 12, PA12 amorphous polyamide, polybutylene terephthalate, and polyarylate.

3. The method for forming a joint according to claim 1, wherein the resin material is polycarbonate, and the sphere equivalent diameter of the fine bubbles generated in the portion of the resin material is from 0.01 mm to 1 mm.

4. The method for forming a joint according to claim 1, wherein the resin material is nylon 6, and the sphere equivalent diameter of the fine bubbles generated in the resin material at the portion to be joined is from 0.05 mm to 1 mm.

5. The method for forming a joint according to claim 1, wherein the resin material is nylon 12, and the sphere equivalent diameter of the fine bubbles generated in the resin material at the portion to be joined is from 0.01 mm to 0.3 mm.

6. The method for forming a joint according to claim 1, wherein the resin material is PA12 amorphous polyamide, and the sphere equivalent diameter of the fine bubbles generated in the resin material at the portion to be joined is from 0.01 mm to 1.5 mm.

7. The method for forming a joint according to claim 1, wherein the resin material is polybutylene terephthalate, and the sphere equivalent diameter of the fine bubbles generated in the resin material at the portion to be joined is from 0.03 mm to 1 mm.

8. The method for forming a joint according to claim 1, wherein the resin material is polyarylate, and the sphere equivalent diameter of the fine bubbles generated in the resin material at the portion to be joined is from 0.01 mm to 0.5 mm.

9. The method for forming a joint according to claim 1, wherein the joint has a tensile shear strength of not less than 5 MPa.

10. The method for forming a joint according to claim 1, wherein the laser light source is directed from the metallic material side of the joint.

11. The method for forming a joint according to claim 1, wherein the laser light source is directed from the resin side of the joint.

12. The method for forming a joint according to claim 1, wherein the resin is a resin or a resin precursor that is fluidized under a heat source.

13. The method for forming a joint according to claim 1, wherein the fine bubbles are generated on a surface of the portion of the resin material that is in direct contact with the portion of the metallic material.

14. The method for forming a joint according to claim 1, wherein the temperature is not less than the softening temperature of the resin material and is less than the boiling point of the metallic material.

\* \* \* \* \*